United States Patent [19]

Fyfe et al.

[11] Patent Number: 4,718,206
[45] Date of Patent: Jan. 12, 1988

[54] APPARATUS FOR LIMITING THE EFFECT OF VIBRATIONS BETWEEN A STRUCTURE AND ITS FOUNDATION

[76] Inventors: Edward R. Fyfe, 2253 Ninth Ave., San Francisco, Calif. 94116; James M. Kelly, 126 The Uplands, Berkeley, Calif. 94705

[21] Appl. No.: 904,457

[22] Filed: Sep. 8, 1986

[51] Int. Cl.$^4$ .............................................. E04H 9/02
[52] U.S. Cl. ........................................ 52/167; 52/573; 248/634; 384/36
[58] Field of Search ................... 52/167, 393, 573; 248/632, 634, 636, 638; 188/378, 379; 267/63 A, 140.4, 140.5, 141.3, 153; 14/16.1, 16.5; 384/36

[56] References Cited

U.S. PATENT DOCUMENTS

| | | | |
|---|---|---|---|
| 1,574,985 | 3/1926 | McWain | 248/632 |
| 2,055,000 | 9/1980 | Bacigalupo | 72/77 |
| 2,705,928 | 4/1955 | Pont | 52/80 |
| 2,833,499 | 5/1958 | Lysedahl | 248/602 |
| 3,245,646 | 4/1966 | Baratoff | 248/568 |
| 3,289,998 | 12/1966 | Baratoff | 248/358 |
| 3,371,899 | 3/1968 | Johnson | 410/88 |
| 3,604,306 | 9/1971 | Denholm | 411/535 |
| 3,748,800 | 7/1973 | Glicksberg | 52/167 |
| 3,806,975 | 4/1974 | Fyfe | 14/16.1 |
| 3,856,242 | 12/1974 | Cook | 248/548 |
| 3,906,689 | 9/1975 | Nakayama | 52/167 |
| 3,921,240 | 11/1975 | Fyfe | 14/16.1 |
| 4,121,393 | 10/1978 | Renault et al. | 52/167 |
| 4,166,344 | 9/1979 | Ikonomou | 52/167 |
| 4,187,573 | 2/1980 | Fyfe et al. | 14/16.1 |
| 4,209,868 | 7/1980 | Tada et al. | 14/16.1 |
| 4,222,206 | 9/1980 | Kitamura | 52/167 |
| 4,266,379 | 5/1981 | Aguilar | 52/1 |
| 4,499,694 | 2/1985 | Buckle et al. | 52/167 |
| 4,514,942 | 5/1985 | Pocanschi | 52/167 |
| 4,527,365 | 7/1985 | Yoshizawa | 52/67 |
| 4,533,109 | 8/1985 | Delam | 248/542 |
| 4,638,609 | 1/1987 | Csák | 52/167 |

FOREIGN PATENT DOCUMENTS

| | | | |
|---|---|---|---|
| 281875 | 2/1915 | Fed. Rep. of Germany | 52/167 |
| 705183 | 6/1931 | France | 248/634 |
| 672578 | 5/1952 | United Kingdom | 248/634 |
| 969398 | 9/1964 | United Kingdom | 267/153 |

OTHER PUBLICATIONS

K.T. Paniev, Bul. 17/5. 5. 78, May 1978, one page.

Primary Examiner—John E. Murtagh
Assistant Examiner—Andrew Joseph Rudy
Attorney, Agent, or Firm—Jack M. Wiseman

[57] ABSTRACT

Apparatus for limiting the effect of vibrations between a building structure and its foundation is disposed between the foundation and the building structure. A plate is fixedly secured to a lower surface of the building structure. A hollow member having a rectangular cross-section is fixedly secured to the plate. An elastomeric bearing is disposed between and fixed to the hollow member and an upper surface of a foundation. A cable, anchored to the foundation, is centrally disposed within the elastomeric bearing and the hollow member, and has a stop attached to the free end thereof. The stop is disposed within the hollow member. The stop serves to limit horizontal and vertical movement of the elastomeric bearing. In a modified apparatus for limiting the effect of vibrations between the building structure and the foundation, an elastomeric material is disposed between the stop and the base of the hollow member to distribute a load applied by the stop through the deflection of the elastomeric material.

15 Claims, 3 Drawing Figures

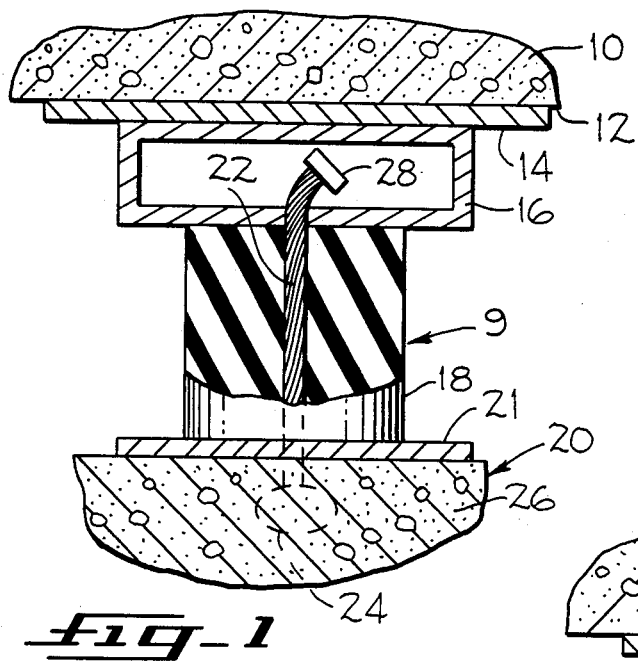
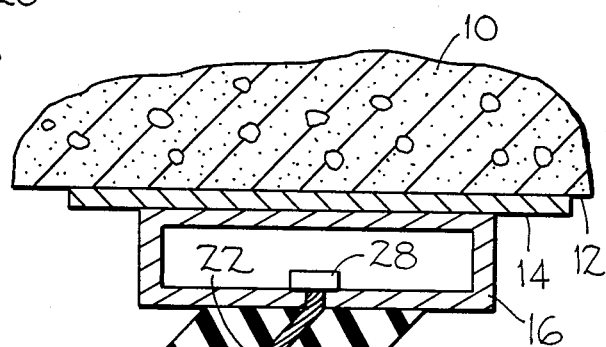
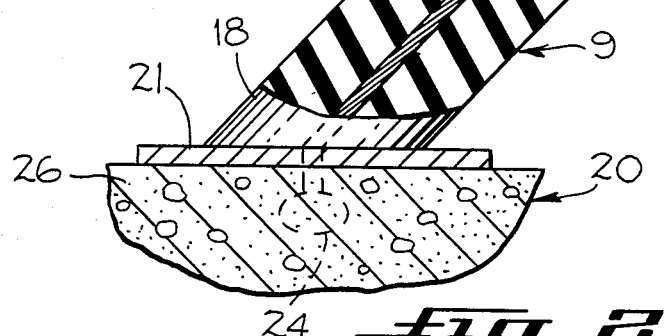
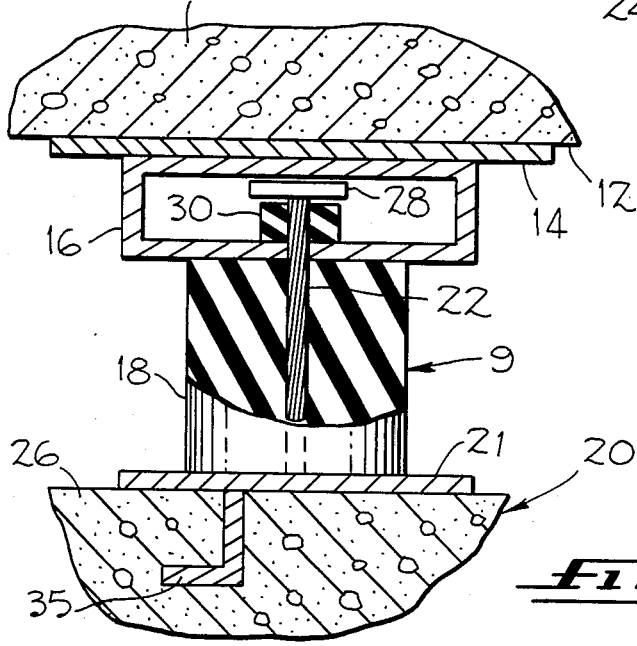

APPARATUS FOR LIMITING THE EFFECT OF VIBRATIONS BETWEEN A STRUCTURE AND ITS FOUNDATION

BACKGROUND OF THE INVENTION

The present invention relates in general to energy absorbers to reduce the influence of externally induced motion on structures, and more particularly to a load bearing assembly for mounting between a foundation and a structure to protect the structure from undesirable effects associated with an earthquake.

The earthquake phenomenon presents kinetic energy in a low frequency oscillatory mode. The part of the earth's surface directly above the focus of an earthquake is referred to as an epicenter. Kinetic energy resulting from an earthquake travels outward from the epicenter, effecting movement of the ground in its path. For purposes of analysis, the kinetic energy may be considered as being comprised of horizontal and vertical components. In practice, the horizontal components are typically of a greater magnitude than the vertical components.

Building constructions have the foundations thereof rigidly fixed to the ground. As a consequence thereof, energy present in an earthquake is transmitted to the building foundation, and, hence, to the building itself, resulting in structural failure. Foundations have been employed to limit the magnitude of the force transmitted to a building during earthquakes.

In U.S. Pat. No. 3,748,800, issued on July 31, 1973, to Raymond C. Glicksberg, for Earthquake-Insulation Foundations, there is disclosed a watertight building-base located within a water filled pool excavated in the earth, having sides and a bottom which are flexibly reinforced. The base of the building is centrally positioned within the pool by means of centering springs which provide a return force between the sides of the pool excavation and the sides of the base. Also disclosed in U.S. Pat. No. 3,748,800 is a flat bottomed building base that rests on a surface of a pit of sand or other dry granular material.

In U.S. Pat. No. 3,906,689, issued on Sept. 23, 1975, to Tadayoshi Nakayama, for Apparatus For Absorbing Or Damping Vibrations Of The Ground, there is disclosed an apparatus for absorbing or damping vibrations of the ground caused by earthquakes and the like before the vibrations are transmitted to a building. The apparatus comprises a main vibration absorbing assembly and an auxiliary load carrying assembly, which are individually disposed between a groundsill of the building and the foundation of the building. The main vibration absorbing assembly comprises a group of springs mounted on a plate, with the axes thereof being inclined upwardly and inwardly so as to converge at an intersecting point where they are pivotally connected for tilting movement in every direction. The auxiliary load carrying assembly comprises a frame mounted under groundsills in positions directly under struts of a building, and an associated ball supported at the lower end of the load carrying assembly, in rolling engagement with the foundation.

U.S. Pat. No. 4,166,344, issued on Sept. 4, 1979, to Aristarchos S. Ikonomou, for Earthquake Guarding System, discloses a support and connecting means. The support provides elastic resistance to the movement of an associated structure and the connecting means provides a frangible link between the structure and the ground, breaking when the forces associated with an earthquake exceed a predetermined strength.

U.S. Pat. No. 4,533,109, issued on Aug. 6, 1985, to Heinz Delam, for Elastic Support Unit, discloses the use of an elastic support unit having a supporting element. The supporting element includes an elastic part and a sliding part. The elastic part is first elastically deformed under the action of a load and the supporting element acts within a first region. Then, the sliding part allows the supporting element to slide over a slide path and the supporting element acts within a second region. Thereafter, the supporting element upon passing the sliding region uses its stress reserve and after exceeding the stress reserve deforms the elastic part and thereby acts in a third region.

U.S. Pat. No. 4,121,393, issued on Oct. 24, 1978, to Jean Renault et al., for Device For Protecting A Structure Against The Effects Of High Horizontal Dynamic Stresses, discloses a system of friction supports comprised of seating blocks applied against each other and incorporated respectively with a structure and a foundation. Relative displacement is permitted employing friction of the associated seating blocks along their mutual bearing interface.

U.S. Pat. No. 4,527,365, issued on July 9, 1985, to Toshikazu Yoshizawa et al., for Earthquake Insulating Bearing Assembly, discloses a first and second friction member employed in an elastic bearing assembly. Corrective action with respect to the bearing assembly subsequent to an earthquake is employed with respect to the second friction member. U.S. Pat. No. 4,499,694, issued on Feb. 19, 1985, to Ian G. Buckle et al., for Cyclic Shear Energy Absorber, discloses a cyclic shear energy absorber to absorb energy induced by motion between members by plastic cyclical deformation of a central energy absorber core. The core is surrounded by a restraining element having movable inner walls. The restraining element is confined to a cylindrical aperture formed in a resilient support. The resilient support has alternate layers of a resilient material and stiffener plates. The resilient support functions as a bearing pad for transferring vertical loads through the device.

U.S. Pat. No. 4,187,573, issued on Feb. 12, 1980, to Edward R. Fyfe et al., for High Load Bearing For Bridges And Similar Structures, discloses an elastomer pad having a concave periphery and means which mechanically abut the elastomer pad to limit lateral movement on the upper and lower surfaces of the elastomer pad. The U.S. Pat. No. 4,514,942, issued on May 7, 1985, to Adrian Pocanschi, for Damping Installation For Earthquake-Endangered Buildings, discloses a vibration insulator between a foundation and a building.

SUMMARY OF THE INVENTION

Apparatus for limiting the effects of vibrations between a structure and its foundation comprising an elastomeric bearing pad and a hollow member disposed between the structure and its foundation. A cable or tensioning device is anchored at one end thereof to the foundation and extends through the elastomeric load bearing pad. The cable or tensioning device terminates inside of the hollow member and has a stop on the end thereof disposed within the hollow member. Hence, the cable or tensioning device is anchored on one end thereof to the foundation below the elastomeric load bearing pad and at the free end thereof the cable or tensioning device has a stop disposed within the hollow member.

The elastomeric load bearing pad not only supports the structure, but also provides for the absorption of vibrations typically associated with an earthquake. As the elastomeric load bearing pad reacts to vibrations, it will deform. As the elastomeric load bearing pad deforms, the cable or tensioning device passing therethrough will be moved downwardly to limit horizontal and vertical displacement of the elastomeric load bearing pad.

Elastomeric material may be disposed between the stop and a lower surface of the hollow member to provide restraints against vertical uplift, while simultaneously distributing forces over a load deflection of the elastomeric material within the hollow member.

A feature of the present invention is that the elastomeric load bearing pad is active for all movements of the foundation resulting from an earthquake. Thus, there is present in the apparatus of the present invention, the damping of vertical vibrations, as well as horizontal vibrations.

DESCRIPTION OF THE DRAWINGS

FIG. 1 is a diagrammatic cross-sectional view of the apparatus embodying the present invention for limiting the effect of vibrations between a structure and its foundation shown with a section of a foundation and a section of a structure.

FIG. 2 is a diagrammatic cross-sectional view of the apparatus shown FIG. 1 subsequent to horizontal displacement of the foundation by an earthquake.

FIG. 3 is a diagrammatic cross-sectional view of the apparatus shown in FIG. 1 modified to include elastomeric material disposed between a cable stop and a lower surface of a hollow member.

DESCRIPTION OF THE PREFERRED EMBODIMENT

Illustrated in FIG. 1 is an apparatus 9 embodying the present invention for limiting the effect of vibrations typically associated with an earthquake between a structure 10 and its foundation 20. The apparatus 9 absorbs and dampens vibrations caused by an earthquake or the like to impede the vibrations from being transmitted to the building or structure 10 through its foundation 20. The building or structure 10 includes a bottom surface 12. A rigid plate 14, such as a steel plate, is fixedly attached to the bottom surface 12. A hollow member 16, such as a steel member, having preferably a rectangular cross-sectional area is fixedly secured to rigid plate 14.

The hollow member 16 is disposed on top of and secured to an elastomeric load bearing pad 18. In turn, the elastomeric load bearing pad 18 is disposed on top of and secured to the foundation 20 through a rigid plate 21, such as a steel member. A cable 22, preferably a steel cable, or a tensioning device is disposed in the hollow member 16, and passes freely through an opening formed in the lower surface thereof. The cable or tensioning device 22 then passes freely through an opening formed in the elastomeric load bearing pad 18 and into the foundation 20 to be fixed to a suitable anchor 24. The anchor 24 is embedded in suitable material 26, i.e. concrete, of the foundation 20. A suitable stop 28 is affixed onto the free end of cable or tensioning device 22 and is disposed within the hollow tube 16. The stop 28 prevents the free end of the cable or tensioning device 22 from passing through the opening in the hollow member 16. The elastomeric load bearing pad 18 may be made from a suitable elastomer, i.e. neoprene or polyurethane.

In the exemplary embodiment, the elastomeric load bearing pad 18 has a cylindrical configuration. An array of apparatus 9 having elastomeric load bearing pads 18 are fixed to the foundation 20 through the plate 21 to be supported thereby. The array of apparatus 9 having elastomeric load bearing pads 18 support the building 10, while limiting the transmission of vibratory energy associated with an earthquake from the foundation 20 to the structure 10.

During an earthquake, the foundation 20 and a lower portion of the elastomeric load bearing pad 18 are moved horizontally (FIG. 2). The horizontal movement of the lower portion of elastomeric load bearing pad 18 absorbs horizontally applied forces through the elastic deformation of the elastomeric load bearing pad 18, thereby protecting the structure 10 from damage caused by an earthquake. As a result thereof, the lower portion of the elastomeric load bearing pad 18 will be displaced with respect to the upper portion thereof. As the lower end of the cable or tensioning device 22 is held in fixed relation to the foundation 20 by the anchor 24, the upper end of the cable or tensioning device 22 with the stop 28 affixed thereto will move in response to the horizontal deflection of the elastomeric load bearing pad 18. As the elastomeric load bearing pad 18 deforms in a horizontal direction, the cable or tensioning device 22 will be moved downwardly within the hollow member 16 and within the elastomeric load bearing pad 18. The extent of the movement of the elastomeric load bearing pad 18 will be limited by the stop 28 on the cable or tensioning device 22. More particularly, the elastomeric load bearing pad 18 is free to deflect until the stop 28 engages the base of the hollow member 16. However, when the deformation of the elastomeric load bearing pad 18 is sufficiently extensive to cause the stop 28 to engage the base of hollow member 16, the stop 28 will prevent further deformation of the elastomeric load bearing pad 18. Consequently, when the stop 28 engages the base of the hollow member 16, the cable or tensioning device 22 will be drawn taut, thereby limiting further horizontal displacement of the elastomeric load bearing pad 18.

In addition to limiting horizontal deflections of the elastomeric load bearing pad 18 to a preselected amount, the operation of the cable or tensioning device 22 and the stop 28 also limits vertical movement, thereby preventing uplift failure of the elastomeric load bearing pad 18. The elastomeric load bearing pad 18 is active for all movements of the foundation 10. Thus, the elastomeric bearing dampens vertical vibrating motions as well as horizontal vibrating motions. By limiting the extent of the deflection or deformation of the elastomeric load bearing pad 18, failure of the elastomeric load bearing pad 18 during an earthquake is reduced.

In FIG. 3, an elastomeric material 30 is disposed between the stop 28 and the lower surface of the hollow member 16. The cable or tensioning device 22 passes freely through an opening formed in the elastomeric material 30. Upward vertical movement of the foundation 20 causes the elastomeric load bearing pad 18 to be compressed between the foundation 20 and the hollow member 16. Downward vertical movement of the foundation 20 causes the cable or tensioning device 22 to be moved downwardly, thereby drawing the stop 28 against the elastomeric material 30. This action compresses the elastomeric material 30. A downward vertical force associated with the downward vertical movement of the cable or tensioning device 22 will be distributed throughout the load deflection or deformation of the elastomeric material 30. The apparatus 9 shown in FIG. 3 also operates to limit the up-lift failure of the elastomeric load bearing pad 18.

One end of the cable or tensioning device 22 is fixedly attached to the foundation 20 through the rigid plate 21, while the other end of the cable or tensioning device 22 is fixedly attached to the stop 28. The foundation 20 has a right angular anchor 35 imbedded in the concrete 26 thereof.

We claim:

1. Apparatus for limiting vibrational effects between a structure with an underside and its foundation comprising:
   a member attached to the underside of said structure having a chamber and an opening therethrough communicating with said chamber;
   an elastomeric load bearing pad having an opening therethrough disposed between said member and said foundation, said elastomeric load bearing pad being deformable in a horizontal direction to absorb horizontally applied forces;
   flexible cable tensioning means having a lower end and an upper end, said flexible cable tensioning means connected to said foundation at the lower end thereof and passing through the openings in said elastomeric load bearing pad an said member to enter said chamber of said member at the upper end thereof, said flexible cable tensioning means being movable in unison in a horizontal direction in response to the deformation of said elastomeric load bearing pad in the horizontal direction; and
   a stop disposed within the chamber of said member and connected to said tensioning means at the upper end thereof to engage said member to limit the displacement of said elastomeric load bearing pad in the horizontal direction caused by vibrations.

2. Apparatus according to claim 1 wherein said member has a hollow configuration in which said stop is disposed.

3. Apparatus according to claim 1 wherein said hollow member has a rectangular base engageable by said stop.

4. Apparatus as recited in claim 1, wherein said tensioning means is made of steel.

5. Apparatus according to claim 4, wherein said elastomeric load bearing pad is made of an elastomeric material from the group consisting of neoprene and polyurethane.

6. Apparatus according to claim 1 wherein said opening in said elastomeric load bearing pad is centrally located in a vertical direction.

7. Apparatus according to claim 1 and comprising a rigid plate fixed to the underside of said structure and attached to said member.

8. Apparatus according to claim 7 and comprising a rigid plate disposed between said elastomeric load bearing pad and said foundation in fixed relation to said elastomeric load bearing pad and said foundation.

9. Apparatus for limiting vibrational effects between a structure with an underside and its foundation comprising:
   a member attached to the underside of said structure having a chamber and an opening therethrough communicating with said chamber;
   an elastomeric load bearing pad having an opening therethrough disposed between said member and said foundation;
   tensioning means having a lower end and an upper end, said tensioning means being connected to said foundation at the lower end thereof and passing through openings in said elastomeric load bearing pad and said member to enter said chamber of said member at the upper end thereof;
   a stop disposed within the chamber of said member and connected to said tensioning means at the upper end thereof to engage said member to limit the displacement of said elastomeric load bearing pad caused by vibrations; and
   an elastomeric member having an opening therethrough through which said tensioning means passes disposed between said stop and said member for providing restraints against vertical uplift and for the distribution of the load applied by said stop thereagainst.

10. Apparatus according to claim 9 wherein said member has a hollow configuration in which said stop is disposed.

11. Apparatus according to claim 9 wherein said hollow member has a rectangular base engageable by said stop.

12. Apparatus as recited in claim 9 wherein said tensioning means is in the form of a cable made of steel.

13. Apparatus according to claim 12 wherein said elastomeric load bearing pad is made of an elastomeric material from the group consisting of neoprene and polyurethane.

14. Apparatus according to claim 9 and comprising a rigid plate fixed to the underside of said structure and attached to said member.

15. Apparatus according to claim 9 wherein said opening in said elastomeric load bearing pad is centrally located in a vertical direction.

* * * * *